United States Patent
Zhong

(10) Patent No.: US 10,601,811 B2
(45) Date of Patent: Mar. 24, 2020

(54) METHOD FOR CONNECTING TO WLAN HOTSPOT DEVICE, WLAN HOTSPOT DEVICE, AND USER EQUIPMENT

(71) Applicant: Huawei Device Co., Ltd., Dongguan (CN)

(72) Inventor: Zhen Zhong, Shenzhen (CN)

(73) Assignee: HUAWEI DEVICE CO., LTD., Dongguan (CN)

( * ) Notice: Subject to any disclaimer, the term of this patent is extended or adjusted under 35 U.S.C. 154(b) by 229 days.

(21) Appl. No.: 15/159,101

(22) Filed: May 19, 2016

(65) Prior Publication Data
US 2016/0269394 A1    Sep. 15, 2016

Related U.S. Application Data

(63) Continuation of application No. PCT/CN2013/087415, filed on Nov. 19, 2013.

(51) Int. Cl.
*H04W 12/08* (2009.01)
*H04L 29/06* (2006.01)
(Continued)

(52) U.S. Cl.
CPC ......... *H04L 63/083* (2013.01); *H04W 12/003* (2019.01); *H04W 12/06* (2013.01);
(Continued)

(58) Field of Classification Search
CPC ....... H04L 63/08; H04L 63/083; G06F 21/30; G06F 21/44; G06F 21/45; H04W 12/06; H04W 12/08
See application file for complete search history.

(56) References Cited

U.S. PATENT DOCUMENTS 8,887,262 B1 *  11/2014  Turner ............... H04L 63/0853
                                                      709/220
2005/0107089 A1   5/2005  Fukui
(Continued)

FOREIGN PATENT DOCUMENTS

CN       102325271 A      1/2012
CN       102438079 A      5/2012
(Continued)

OTHER PUBLICATIONS

Machine Translation and Abstract of Chinese Publication No. CN103226882, Jul. 31, 2013, 6 pages.
(Continued)

*Primary Examiner* — David J Pearson
(74) *Attorney, Agent, or Firm* — Conley Rose, P.C.

(57) ABSTRACT

A method for connecting to a Wi-Fi hotspot device, the Wi-Fi hotspot device, and a user equipment (UE), where the method includes generating, by the Wi-Fi hotspot device, a two-dimensional barcode according to Wi-Fi authentication information, where the two-dimensional barcode includes the Wi-Fi authentication information, and the Wi-Fi authentication information is used for authentication prior to connection to the Wi-Fi hotspot device, and presenting, by the Wi-Fi hotspot device, the two-dimensional barcode to the UE using a display screen of the Wi-Fi hotspot device such that the UE may connect to the Wi-Fi hotspot device according to the two-dimensional barcode, and a user does not need to memorize or record the Wi-Fi authentication information, thereby improving user experience.

20 Claims, 3 Drawing Sheets

---

UE extracts Wi-Fi authentication information included in a two-dimensional barcode  — 410

The UE completes authentication with a Wi-Fi hotspot device according to the Wi-Fi authentication information, and connects to the Wi-Fi hotspot device  — 420

(51) Int. Cl.
H04W 12/00 (2009.01)
H04W 12/06 (2009.01)
H04W 48/14 (2009.01)
H04W 84/12 (2009.01)
(52) U.S. Cl.
CPC ........... *H04W 12/08* (2013.01); *H04W 48/14* (2013.01); *H04W 12/00522* (2019.01); *H04W 84/12* (2013.01)

(56) References Cited

U.S. PATENT DOCUMENTS

| | | | |
|---|---|---|---|
| 2006/0208088 | A1 | 9/2006 | Sekiguchi |
| 2007/0213040 | A1 | 9/2007 | Itou |
| 2008/0039063 | A1* | 2/2008 | Ichieda .................. H04L 67/36 455/420 |
| 2008/0250122 | A1* | 10/2008 | Zsigmond ............... H04L 67/34 709/220 |
| 2008/0298305 | A1* | 12/2008 | Nakamura ............ H04L 63/068 370/328 |
| 2012/0223132 | A1* | 9/2012 | Lim .................... H04M 1/2755 235/375 |
| 2012/0240183 | A1* | 9/2012 | Sinha .................... H04W 12/08 726/1 |
| 2013/0016710 | A1* | 1/2013 | Shinohara ........... H04M 1/7253 370/338 |
| 2013/0232355 | A1 | 9/2013 | Okazaki |
| 2013/0276075 | A1* | 10/2013 | Gong .................... H04W 76/02 726/5 |
| 2013/0291074 | A1* | 10/2013 | Dittrich .................. G06F 21/36 726/5 |
| 2014/0053246 | A1* | 2/2014 | Huang .................. H04L 63/062 726/4 |
| 2014/0059351 | A1* | 2/2014 | Braskich ................ G06F 21/36 713/171 |
| 2014/0068727 | A1* | 3/2014 | Shamis ................ H04W 12/04 726/5 |
| 2014/0144980 | A1* | 5/2014 | Liu ........................ G06F 17/00 235/375 |

FOREIGN PATENT DOCUMENTS

| | | |
|---|---|---|
| CN | 102724668 A | 10/2012 |
| CN | 103179640 A | 6/2013 |
| CN | 103179647 A | 6/2013 |
| CN | 103226882 A | 7/2013 |
| EP | 2385480 A1 | 11/2011 |
| EP | 2657878 A2 | 10/2013 |
| JP | 2005117488 A | 4/2005 |
| JP | 2007243844 A | 9/2007 |
| JP | 2007324926 A | 12/2007 |
| JP | 2008213294 A | 9/2008 |
| JP | 2008225872 A | 9/2008 |
| JP | 2011182449 A | 9/2011 |
| JP | 2013150150 A | 8/2013 |
| JP | 2013214959 A | 10/2013 |
| WO | 2011132761 A1 | 10/2011 |

OTHER PUBLICATIONS

Sameed, "Connect to WiFi Networks by Scanning QR Codes With Barcode Scanner [Android]," XP55037639, Aug. 24, 2011, 4 pages.
Foreign Communication From a Counterpart Application, European Application No. 13897804.4, European Office Action dated Jul. 26, 2017, 7 pages.
Foreign Communication From a Counterpart Application, Chinese Application No. 201380004065.7, Chinese Search Report dated Jun. 7, 2017, 11 pages.
Machine Translation and Abstract of Japanese Publication No. JP2013150150, Aug. 1, 2013, 26 pages.
Foreign Communication From a Counterpart Application, Japanese Application No. 2016-532054, Japanese Office Action dated May 8, 2017, 2 pages.
Foreign Communication From a Counterpart Application, Japanese Application No. 2016-532054, English Translation of Japanese Office Action dated May 8, 2017, 3 pages.
Partial English Translation and Abstract of Chinese Patent Application No. CN102724668, May 31, 2016, 3 pages.
Partial English Translation and Abstract of Chinese Patent Application No. CN103179640, May 31, 2016, 5 pages.
Foreign Communication From a Counterpart Application, European Application No. 13897804.4, Extended European Search Report dated Oct. 11, 2016, 7 pages.
Foreign Communication From a Counterpart Application, PCT Application No. PCT/CN2013/087415, English Translation of International Search Report dated Sep. 3, 2014, 2 pages.
Foreign Communication From a Counterpart Application, PCT Application No. PCT/CN2013/087415, English Translation of Written Opinion dated Sep. 3, 2014, 13 pages.
Machine Translation and Abstract of Japanese Publication No. JP2007324926, Dec. 13, 2007, 14 pages.
Foreign Communication From a Counterpart Application, Japanese Application No. 2016-532054, Japanese Office Action dated Aug. 24, 2017, 2 pages.
Foreign Communication From a Counterpart Application, Japanese Application No. 2016-532054, English Translation of Japanese Office Action dated Aug. 24, 2017, 3 pages.
Machine Translation and Abstract of Japanese Publication No. JP2011182449, Sep. 15, 2011, 21 pages.
Foreign Communication From a Counterpart Application, Japanese Application No. 2016-532054, Japanese Office Action dated Dec. 14, 2017, 2 pages.
Foreign Communication From a Counterpart Application, Japanese Application No. 2016-532054, English Translation of Japanese Office Action dated Dec. 19, 2017, 4 pages.
Machine Translation and Abstract of Chinese Publication No. CN103179647, Jun. 26, 2013, 12 pages.
Machine Translation and Abstract of Chinese Publication No. CN102325271, Jan. 18, 2012, 18 pages.
Foreign Communication From a Counterpart Application, Chinese Application No. 201380004065.7, Chinese Office Action dated Jan. 23, 2018, 5 pages.
Foreign Communication From a Counterpart Application, Japanese Application No. 2017-228413, Japanese Notice of Reasons for Rejections dated Sep. 21, 2018, 3 pages.
Foreign Communication From a Counterpart Application, Japanese Application No. 2017-228413, English Translation of Japanese Notice of Reasons for Rejections dated Sep. 21, 2018, 4 pages.
Machine Translation and Abstract of Japanese Publication No. JP2008213294, Sep. 18, 2008, 19 pages.
Foreign Communication From a Counterpart Application, Japanese Application No. 2017-228413, Japanese Office Action dated Jun. 7, 2019, 3 pages.
Foreign Communication From a Counterpart Application, Japanese Application No. 2017-228413, English Translation of Japanese Office Action dated Jun. 11, 2019, 4 pages.
Machine Translation and Abstract of Chinese Publication No. CN102438079, May 2, 2012, 16 pages.
Foreign Communication From a Counterpart Application, Singaporean Application No. 11201702804P, Singaporean Notice of Allowance dated Dec. 11, 2019, 5 pages.
Machine Translation and Abstract of Japanese Publication No. JP2008225872A, 11 pages.
Foreign Communication From a Counterpart Application, Japanese Application No. 2017-228413, Examiner's Decision of Refusal, Jan. 21, 2020, 2 pages.
Foreign Communication From a Counterpart Application, Japanese Application No. 2017-228413, Decision of Dissmal Amendment, Jan. 21, 2020, 3 pages.

* cited by examiner

METHOD FOR CONNECTING TO WLAN HOTSPOT DEVICE, WLAN HOTSPOT DEVICE, AND USER EQUIPMENT

CROSS-REFERENCE TO RELATED APPLICATIONS

This application is a continuation of International Application No. PCT/CN2013/087415, filed on Nov. 19, 2013, which is hereby incorporated by reference in its entirety.

TECHNICAL FIELD

The present disclosure relates to the field of communications, and in particular, to a method for connecting to a Wi-Fi hotspot device, a Wi-Fi hotspot device, and user equipment (UE).

BACKGROUND

Currently, UE connecting to a Wi-Fi hotspot device and using the Wi-Fi hotspot device to connect to the Internet is a very mature technology. When a user uses UE to connect to a Wi-Fi hotspot device, the user needs to select a specific Wi-Fi hotspot device from hotspot devices that are currently found by the UE, and then inputs corresponding authentication information, such as an authentication mode or an authentication password, into the UE, and the UE can connect to the Wi-Fi hotspot device only after being authenticated using the corresponding authentication information. In such a connection manner, a user needs to perform some operations, which brings inconvenience and degrades user experience.

SUMMARY

Embodiments of the present disclosure provide a method for connecting to a Wi-Fi hotspot device, a Wi-Fi hotspot device, and user equipment, which can improve user experience.

According to a first aspect, a method for connecting to a Wi-Fi hotspot device is provided, including generating, by a Wi-Fi hotspot device, a two-dimensional barcode according to Wi-Fi authentication information, where the two-dimensional barcode includes the Wi-Fi authentication information, and the Wi-Fi authentication information is used for authentication prior to connection to the Wi-Fi hotspot device, and presenting, by the Wi-Fi hotspot device, the two-dimensional barcode to UE using a display screen of the Wi-Fi hotspot device.

With reference to the first aspect, in a first possible implementation manner, the method further includes dynamically updating, by the Wi-Fi hotspot device, the Wi-Fi authentication information, and generating, by the Wi-Fi hotspot device, a two-dimensional barcode according to Wi-Fi authentication information includes dynamically generating, by the Wi-Fi hotspot device, a two-dimensional barcode according to dynamically updated Wi-Fi authentication information.

With reference to the first aspect or the first possible implementation manner of the first aspect, in a second possible implementation manner, the Wi-Fi authentication information includes at least one of a service set identifier (SSID), an authentication mode, and an authentication password.

According to a second aspect, a method for connecting to a Wi-Fi hotspot device is provided, including generating, by a Wi-Fi hotspot device, a two-dimensional barcode according to Wi-Fi authentication information, where the two-dimensional barcode includes the Wi-Fi authentication information, and the Wi-Fi authentication information is used for authentication prior to connection to the Wi-Fi hotspot device, and setting, by the Wi-Fi hotspot device, the two-dimensional barcode in a management application program that corresponds to the Wi-Fi hotspot device, where the management application program is used to provide the two-dimensional barcode for another UE, and the other UE is used to present, using a display screen of the other UE, the two-dimensional barcode to UE that needs to connect to the Wi-Fi hotspot device.

With reference to the second aspect, in a first possible implementation manner, the management application program runs in the other UE.

With reference to the second aspect or the first possible implementation manner of the second aspect, in a second possible implementation manner, the method further includes dynamically updating, by the Wi-Fi hotspot device, the Wi-Fi authentication information, and generating, by a Wi-Fi hotspot device, a two-dimensional barcode according to Wi-Fi authentication information includes dynamically generating, by the Wi-Fi hotspot device, a two-dimensional barcode according to dynamically updated Wi-Fi authentication information.

With reference to the second aspect or the first possible implementation manner or the second possible implementation manner of the second aspect, in a third possible implementation manner, the Wi-Fi authentication information includes at least one of an SSID, an authentication mode, and an authentication password.

According to a third aspect, a method for connecting to a Wi-Fi hotspot device is provided, including extracting, by the UE, Wi-Fi authentication information included in a two-dimensional barcode, and completing, by the UE, authentication with a Wi-Fi hotspot device according to the Wi-Fi authentication information, and connecting to the Wi-Fi hotspot device.

With reference to the third aspect, in a first possible implementation manner, the two-dimensional barcode is generated by the Wi-Fi hotspot device.

With reference to the third aspect, in a second possible implementation manner, the two-dimensional barcode is generated by a management device that corresponds to the Wi-Fi hotspot device.

With reference to the third aspect or the first possible implementation manner or the second possible implementation manner of the third aspect, in a third possible implementation manner, extracting, by the UE, Wi-Fi authentication information included in a two-dimensional barcode includes scanning, by the UE, a two-dimensional barcode that is presented on a display screen of the Wi-Fi hotspot device, and extracting Wi-Fi authentication information included in the two-dimensional barcode.

With reference to the third aspect or the first possible implementation manner or the second possible implementation manner of the third aspect, in a fourth possible implementation manner, extracting, by the UE, Wi-Fi authentication information included in a two-dimensional barcode includes scanning, by the UE, a two-dimensional barcode that is presented on a display screen of another UE, and extracting Wi-Fi authentication information included in the two-dimensional barcode, where the two-dimensional barcode is acquired by the other UE from a management application program that corresponds to the Wi-Fi hotspot device.

With reference to the fourth possible implementation manner of the third aspect, in a fifth possible implementation manner, the management application program runs in the other UE.

With reference to the third aspect or any manner of the first possible implementation manner to the fifth possible implementation manner of the third aspect, in a sixth possible implementation manner, before connecting to the Wi-Fi hotspot device, the method further includes checking, by the UE, whether a Wi-Fi function of the UE is enabled, and enabling, by the UE, the Wi-Fi function if the Wi-Fi function is not enabled.

With reference to the third aspect or any manner of the first possible implementation manner to the sixth possible implementation manner of the third aspect, in a seventh possible implementation manner, the Wi-Fi authentication information includes at least one of an SSID, an authentication mode, and an authentication password.

According to a fourth aspect, a Wi-Fi hotspot device is provided, including a generating unit configured to generate a two-dimensional barcode according to Wi-Fi authentication information, where the two-dimensional barcode includes the Wi-Fi authentication information, and the Wi-Fi authentication information is used for authentication prior to connection to the Wi-Fi hotspot device, and a presenting unit configured to present the two-dimensional barcode to UE using a display screen of the Wi-Fi hotspot device.

With reference to the fourth aspect, in a first possible implementation manner, the Wi-Fi hotspot device further includes an updating unit, where the updating unit is configured to dynamically update the Wi-Fi authentication information, and the generating unit is further configured to dynamically generate a two-dimensional barcode according to dynamically updated Wi-Fi authentication information.

With reference to the fourth aspect or the first possible implementation manner of the fourth aspect, in a second possible implementation manner, the Wi-Fi authentication information includes at least one of an SSID, an authentication mode, and an authentication password.

According to a fifth aspect, a Wi-Fi hotspot device is provided, including a generating unit configured to generate a two-dimensional barcode according to Wi-Fi authentication information, where the two-dimensional barcode includes the Wi-Fi authentication information, and the Wi-Fi authentication information is used for authentication prior to connection to the Wi-Fi hotspot device, and a setting unit configured to set the two-dimensional barcode in a management application program that corresponds to the Wi-Fi hotspot device, where the management application program is used to provide the two-dimensional barcode for another UE, and the other UE is used to present, using a display screen of the other UE, the two-dimensional barcode to UE that needs to connect to the Wi-Fi hotspot device.

With reference to the fifth aspect, in a first possible implementation manner, the management application program runs in the other UE.

With reference to the fifth aspect or the first possible implementation manner of the fifth aspect, in a second possible implementation manner, the Wi-Fi hotspot device further includes an updating unit, where the updating unit is configured to dynamically update the Wi-Fi authentication information, and the generating unit is further configured to dynamically generate a two-dimensional barcode according to dynamically updated Wi-Fi authentication information.

With reference to the fifth aspect or the first possible implementation manner or the second possible implementation manner of the fifth aspect, in a third possible implementation manner, the Wi-Fi authentication information includes at least one of an SSID, an authentication mode, and an authentication password.

According to a sixth aspect, user equipment is provided, including an extracting unit configured to extract Wi-Fi authentication information included in a two-dimensional barcode, and a connecting unit configured to complete authentication with a Wi-Fi hotspot device according to the Wi-Fi authentication information, and connect to the Wi-Fi hotspot device.

With reference to the sixth aspect, in a first possible implementation manner, the two-dimensional barcode is generated by the Wi-Fi hotspot device, or the two-dimensional barcode is generated by a management device that corresponds to the Wi-Fi hotspot device.

With reference to the sixth aspect or the first possible implementation manner of the sixth aspect, in a second possible implementation manner, the extracting unit is further configured to scan a two-dimensional barcode that is presented on a display screen of the Wi-Fi hotspot device, and extract Wi-Fi authentication information included in the two-dimensional barcode.

With reference to the sixth aspect or the first possible implementation manner of the sixth aspect, in a third possible implementation manner, the extracting unit is further configured to scan a two-dimensional barcode that is presented on a display screen of another UE, and extract Wi-Fi authentication information included in the two-dimensional barcode, where the two-dimensional barcode is acquired by the other UE from a management application program that corresponds to the Wi-Fi hotspot device.

With reference to the third possible implementation manner of the sixth aspect, in a fourth possible implementation manner, the management application program runs in the other UE.

With reference to the sixth aspect or any manner of the first possible implementation manner to the fourth possible implementation manner of the sixth aspect, in a fifth possible implementation manner, the connecting unit is further configured to check whether a Wi-Fi function of the UE is enabled before connecting to the Wi-Fi hotspot device, and enable the Wi-Fi function if the Wi-Fi function is not enabled.

According to a seventh aspect, a Wi-Fi hotspot device is provided, including a memory, a processor, and a display screen. The memory is configured to store an executable instruction. The processor executes the executable instruction stored in the memory, and is configured to generate a two-dimensional barcode according to Wi-Fi authentication information, where the two-dimensional barcode includes the Wi-Fi authentication information, and the Wi-Fi authentication information is used for authentication prior to connection to the Wi-Fi hotspot device, and present the two-dimensional barcode to UE using the display screen.

With reference to the seventh aspect, in a first possible implementation manner, the processor is further configured to dynamically update the Wi-Fi authentication information, and dynamically generate a two-dimensional barcode according to dynamically updated Wi-Fi authentication information.

With reference to the seventh aspect or the first possible implementation manner of the seventh aspect, in a second possible implementation manner, the Wi-Fi authentication information includes at least one of an SSID, an authentication mode, and an authentication password.

According to an eighth aspect, a Wi-Fi hotspot device is provided, including a memory and a processor. The memory is configured to store an executable instruction. The processor executes an executable instruction stored in the memory, and is configured to generate a two-dimensional barcode according to Wi-Fi authentication information, where the two-dimensional barcode includes the Wi-Fi authentication information, and the Wi-Fi authentication information is used for authentication prior to connection to the Wi-Fi hotspot device, and set the two-dimensional barcode in a management application program that corresponds to the Wi-Fi hotspot device, where the management application program is used to provide the two-dimensional barcode for another UE, and the other UE is used to present, using a display screen of the other UE, the two-dimensional barcode to UE that needs to connect to the Wi-Fi hotspot device.

With reference to the eighth aspect, in a first possible implementation manner, the management application program runs in the other UE.

With reference to the eighth aspect or the first possible implementation manner of the eighth aspect, in a second possible implementation manner, the processor is further configured to dynamically update the Wi-Fi authentication information, and dynamically generate a two-dimensional barcode according to dynamically updated Wi-Fi authentication information.

With reference to the eighth aspect or the first possible implementation manner or the second possible implementation manner of the eighth aspect, in a third possible implementation manner, the Wi-Fi authentication information includes at least one of an SSID, an authentication mode, and an authentication password.

According to a ninth aspect, UE is provided, including a memory and a processor. The memory is configured to store an executable instruction. The processor executes the executable instruction stored in the memory, and is configured to extract Wi-Fi authentication information included in a two-dimensional barcode, and complete authentication with a Wi-Fi hotspot device according to the Wi-Fi authentication information, and connect to the Wi-Fi hotspot device.

With reference to the ninth aspect, in a first possible implementation manner, the two-dimensional barcode is generated by the Wi-Fi hotspot device, or the two-dimensional barcode is generated by a management device that corresponds to the Wi-Fi hotspot device.

With reference to the ninth aspect or the first possible implementation manner of the ninth aspect, in a second possible implementation manner, the UE further includes a camera. The processor controls the camera to scan a two-dimensional barcode that is presented on a display screen of the Wi-Fi hotspot device, and extracts Wi-Fi authentication information included in the two-dimensional barcode.

With reference to the ninth aspect or the first possible implementation manner of the ninth aspect, in a third possible implementation manner, the processor controls a camera to scan a two-dimensional barcode that is presented on a display screen of another UE, and extracts Wi-Fi authentication information included in the two-dimensional barcode, where the two-dimensional barcode is acquired by the other UE from a management application program that corresponds to the Wi-Fi hotspot device.

With reference to the third possible implementation manner of the ninth aspect, in a fourth possible implementation manner, the management application program runs in the other UE.

With reference to the ninth aspect or any manner of the first possible implementation manner to the fourth possible implementation manner of the ninth aspect, in a fifth possible implementation manner, the connecting unit is further configured to check whether a Wi-Fi function of the UE is enabled before connecting to the Wi-Fi hotspot device, and enable the Wi-Fi function if the Wi-Fi function is not enabled.

In the embodiments of the present disclosure, a Wi-Fi hotspot device generates a two-dimensional barcode that includes Wi-Fi authentication information, and presents the two-dimensional barcode to UE using a display screen of the Wi-Fi hotspot device such that the UE can connect to the Wi-Fi hotspot device according to the two-dimensional barcode, and a user does not need to memorize or record the Wi-Fi authentication information, thereby improving user experience.

BRIEF DESCRIPTION OF DRAWINGS

To describe the technical solutions in the embodiments of the present disclosure more clearly, the following briefly introduces the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

In the embodiments of the present disclosure, UE, also referred to as a mobile terminal (MT), mobile user equipment, and the like, may communicate with one or more core networks using a radio access network (RAN). The UE may be a MT, such as a mobile phone (also referred to as a "cellular" phone) and a computer with a MT. For example, the UE may be a portable, pocket-sized, handheld, computer built-in, or in-vehicle mobile apparatus. For example, a product form of the UE may include a mobile phone, a tablet computer, or the like, or may be a smart wearable device such as a SMART WATCH or SMART GLASSES.

Figure 1:
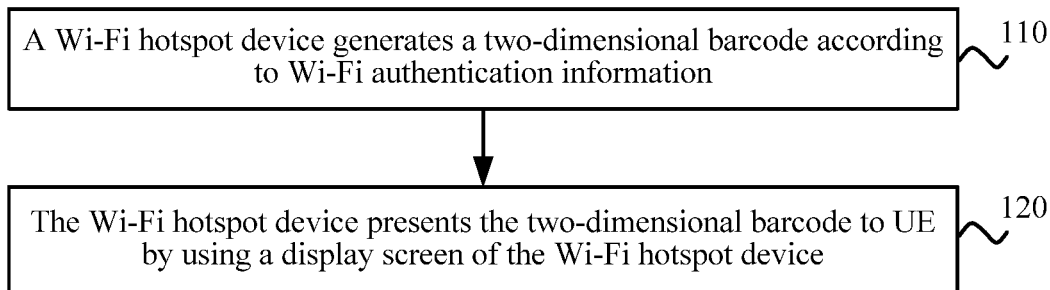
FIG. 1 is a schematic flowchart of a method for connecting to a Wi-Fi hotspot device according to an embodiment of the present disclosure.

FIG. 1 is a schematic flowchart of a method for connecting to a Wi-Fi hotspot device according to an embodiment of the present disclosure. The method of FIG. 1 is executed by a Wi-Fi hotspot device. The Wi-Fi hotspot device may include a wireless router, mobile Wi-Fi, or a device that is in another product form and can be used as a Wi-Fi hotspot, and method may include the following steps.

Step 110: The Wi-Fi hotspot device generates a two-dimensional barcode according to Wi-Fi authentication information, where the two-dimensional barcode includes the Wi-Fi authentication information, and the Wi-Fi authentication information is used for authentication prior to connection to the Wi-Fi hotspot device.

Step 120: The Wi-Fi hotspot device presents the two-dimensional barcode to UE using a display screen of the Wi-Fi hotspot device.

The Wi-Fi hotspot device may present the two-dimensional barcode on the display screen of the Wi-Fi hotspot device such that the UE can read the presented two-dimensional barcode. For example, the UE may scan the two-dimensional barcode using a third-party application, for example, scanning the two-dimensional barcode using existing software "Barcode Scanner".

In an existing process of connecting to a Wi-Fi hotspot device, a user needs to memorize or record Wi-Fi authentication information, and manually input such information into UE, which causes poor user experience. However, in this embodiment of the present disclosure, the Wi-Fi hotspot device can generate a two-dimensional barcode that includes Wi-Fi authentication information, and present the two-dimensional barcode to UE. Therefore, the UE can extract the Wi-Fi authentication information from the two-dimensional barcode, and connect to the Wi-Fi hotspot device according to the Wi-Fi authentication information, and a user no longer needs to manually input authentication information, thereby reducing operations of the user, and improving user experience.

In addition, currently, authentication modes of some Wi-Fi hotspot devices are set to "Open", that is, a user does not need to input a password into UE, and the UE can directly connect to a Wi-Fi hotspot device after finding the Wi-Fi hotspot device. In such a manner, the user does not need to input corresponding authentication information into the UE, but it is extremely insecure because there is no password protection. However, in this embodiment of the present disclosure, the Wi-Fi hotspot device generates a two-dimensional barcode that includes Wi-Fi authentication information such that UE connects to the Wi-Fi hotspot device according to the two-dimensional barcode, which, compared with a password-free mode, can still ensure security of a Wi-Fi network.

Therefore, in this embodiment of the present disclosure, the Wi-Fi hotspot device generates the two-dimensional barcode that includes the Wi-Fi authentication information, and presents the two-dimensional barcode to the UE using the display screen of the Wi-Fi hotspot device such that the UE can connect to the Wi-Fi hotspot device according to the two-dimensional barcode, and the user does not need to memorize or record the Wi-Fi authentication information, thereby improving user experience.

Optionally, as an embodiment, the Wi-Fi authentication information may include at least one of an SSID, an authentication mode, and an authentication password.

A two-dimensional barcode may be considered as a two-dimensional extension of a traditional one-dimensional "barcode". The two-dimensional barcode may be construed as an image in which a piece of text information is encapsulated. Specific content of the text information is not limited, and may be, for example, a uniform resource locator (URL), an electronic mail (e-mail) address, personal contact card information, or the like. In this embodiment of the present disclosure, the two-dimensional barcode generated by the Wi-Fi hotspot device may be used for encapsulating Wi-Fi authentication information. In addition, the two-dimensional barcode in this embodiment of the present disclosure may further be replaced by a barcode, a three-dimensional barcode, or other predefined graphics, all of which can be used for encapsulating Wi-Fi authentication information.

Preferably, the authentication information included in the two-dimensional barcode may include an SSID, an authentication mode, and an authentication password. In this case, the user does not need to perform any additional operation, which can improve user experience. In another case, the authentication information included in the two-dimensional barcode may include only an authentication mode and an authentication password. In this case, the user can manually select an SSID. Similarly, the authentication information may include only an authentication password, and the user can manually select an SSID and an authentication mode.

Figure 2:
FIG. 2 is a schematic diagram of a two-dimensional barcode according to an embodiment of the present disclosure.

There are multiple types of two-dimensional barcodes, such as two-dimensional barcodes with different structures, and compiling and reading methods. Common types of two-dimensional barcodes include: a portable data file (PDF) 417 code, a quick response code (QR code), a Chinese-sensible code, a color barcode, and the like. Currently, a most commonly used one is the QR code. FIG. 2 is a schematic diagram of a two-dimensional barcode according to an embodiment of the present disclosure. As shown in FIG. 2, text information included in the two-dimensional barcode may be "WiFi:S:test1;T:WPA;P:1234;", where the text information may indicate that an SSID is test1, an authentication mode is Wi-Fi protected access (WPA)/WPA2, and an authentication password is 1234.

For example, Table 1 shows a definition description of text information in an exemplary two-dimensional barcode. In Table 1, it is assumed that the text information is "WiFi:T:WPA;S:mynetwork;P:mypass;".

TABLE 1

Description of text information in two-dimensional barcode

| Parameter | Example | Description |
|---|---|---|
| T | WPA | Authentication mode, which may be wireless encryption protocol (WEP) or WPA, or "nopass" indicating no password |
| S | mynetwork | Network SSID |
| P | mypass | Password |
| H | true | Optional, and it is true if a network SSID is hidden |

Optionally, as another embodiment, in step 110, the Wi-Fi authentication information may be stored inside the Wi-Fi hotspot device, for example, stored in a memory, and therefore, the Wi-Fi hotspot device may read the Wi-Fi information from the memory.

Optionally, as another embodiment, the Wi-Fi hotspot device may dynamically update the Wi-Fi authentication information. In this case, in step 110, the Wi-Fi hotspot device may dynamically generate a two-dimensional barcode according to dynamically updated Wi-Fi authentication information.

Furthermore, the Wi-Fi authentication information may change dynamically, and the Wi-Fi hotspot device may dynamically generate a two-dimensional barcode according to changed Wi-Fi authentication information. For example, an authentication password in the Wi-Fi authentication information may be randomly generated, or may change according to a preset rule. In this case, the Wi-Fi hotspot device may dynamically update the Wi-Fi authentication information, dynamically generate a two-dimensional barcode based on the dynamically updated Wi-Fi authentication information, and then may present the dynamically generated two-dimensional barcode to UE using the display screen of the Wi-Fi hotspot device. This can further improve security of the Wi-Fi network.

Figure 3:
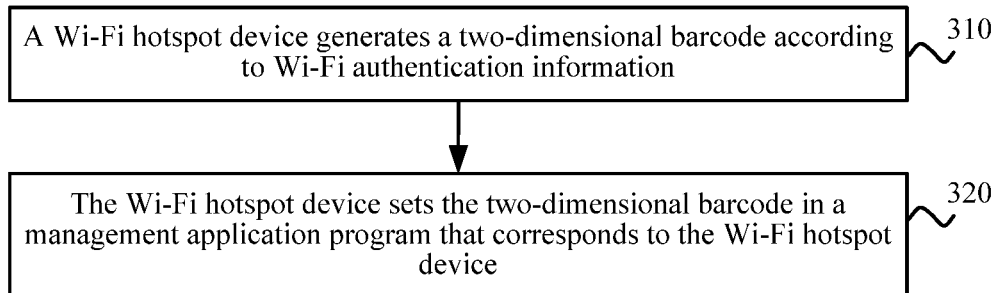
FIG. 3 is a schematic flowchart of a method for connecting to a Wi-Fi hotspot device according to another embodiment of the present disclosure.

FIG. 3 is a schematic flowchart of a method for connecting to a Wi-Fi hotspot device according to another embodiment of the present disclosure. The method of FIG. 3 is performed by a Wi-Fi hotspot device, and the method may include the following steps.

Step 310: The Wi-Fi hotspot device generates a two-dimensional barcode according to Wi-Fi authentication information, where the two-dimensional barcode includes the Wi-Fi authentication information, and the Wi-Fi authentication information is used for authentication prior to connection to the Wi-Fi hotspot device.

Step 320: The Wi-Fi hotspot device sets the two-dimensional barcode in a management application program that corresponds to the Wi-Fi hotspot device, where the management application program is used to provide the two-dimensional barcode for another UE, and the other UE is used to present, using a display screen of the other UE, the two-dimensional barcode to UE that needs to connect to the Wi-Fi hotspot device.

For specific descriptions of the two-dimensional barcode, reference may be made to the embodiments of FIG. 1 and FIG. 2, which are not described again.

In an existing process of connecting to a Wi-Fi hotspot device, a user needs to memorize or record Wi-Fi authentication information, and manually input such information into UE, which causes poor user experience. However, in this embodiment of the present disclosure, the Wi-Fi hotspot device can generate a two-dimensional barcode that includes Wi-Fi authentication information, and set the two-dimensional barcode in the management application program that corresponds to the Wi-Fi hotspot device such that another UE can acquire the two-dimensional barcode and present the two-dimensional barcode to UE that needs to connect to the Wi-Fi hotspot device. In this way, the UE that needs to connect to the Wi-Fi hotspot device can extract the Wi-Fi authentication information from the two-dimensional barcode, a user no longer needs to manually input authentication information, and the UE connects to the Wi-Fi hotspot device according to the Wi-Fi authentication information, thereby improving user experience.

In addition, currently, authentication modes of some Wi-Fi hotspot devices are set to "Open", that is, a user does not need to input a password into UE, and the UE can directly connect to a Wi-Fi hotspot device after finding the Wi-Fi hotspot device. In such a manner, the user does not need to input corresponding authentication information into the UE, but it is extremely insecure because there is no password protection. However, in this embodiment of the present disclosure, the Wi-Fi hotspot device generates a two-dimensional barcode that includes Wi-Fi authentication information such that UE connects to the Wi-Fi hotspot device according to the two-dimensional barcode, which, compared with a password-free mode, can still ensure security of a Wi-Fi network.

Therefore, in this embodiment of the present disclosure, the Wi-Fi hotspot device generates the two-dimensional barcode that includes the Wi-Fi authentication information, and sets the two-dimensional barcode in the management application program that corresponds to the Wi-Fi hotspot device such that the other UE can acquire the two-dimensional barcode from the management application program and present the two-dimensional barcode to the UE that needs to connect to the Wi-Fi hotspot device such that the UE that needs to connect to the Wi-Fi hotspot device can connect to the Wi-Fi hotspot device according to the two-dimensional barcode, and the user does not need to memorize or record the Wi-Fi authentication information, thereby improving user experience.

Furthermore, in step 320, the Wi-Fi hotspot device may present the two-dimensional barcode using another display interface. For example, the Wi-Fi hotspot device may set the generated two-dimensional barcode in the management application program that corresponds to the Wi-Fi hotspot device. For example, the management application program may be a Web management page that corresponds to the Wi-Fi hotspot device, where the Web management page that corresponds to the Wi-Fi hotspot device may be used to modify a network parameter, settings of the Wi-Fi hotspot device, or the like. The management application program may also be a third-party application (App), such as a mobile phone App, that corresponds to the Wi-Fi hotspot device.

Furthermore, the other UE may manage the Wi-Fi hotspot device. The other UE may acquire the two-dimensional barcode from the Web management page of the Wi-Fi hotspot device, and present the two-dimensional barcode on the display screen of the other UE, or the other UE may acquire the two-dimensional barcode using an App, and present the two-dimensional barcode on the display screen of the other UE. For example, the other UE may be a computer, and the computer may present the two-dimensional barcode on a display screen of the computer. In this case, the foregoing UE that needs to connect to the Wi-Fi hotspot device may scan the two-dimensional barcode presented on the display screen of the other UE, to extract the corresponding Wi-Fi authentication information.

The foregoing manner is more applicable to a Wi-Fi hotspot device that does not have a display screen.

In a case in which the Wi-Fi hotspot device provides the two-dimensional barcode using the management application program, the user may further share, using the UE, the two-dimensional barcode with a user of another UE such that the other UE can connect to the Wi-Fi hotspot device, thereby improving user experience.

Optionally, as an embodiment, the management application program may run in the other UE. In this case, the other UE can acquire the two-dimensional barcode from the management application program, and present, using the display screen of the other UE, the two-dimensional barcode to the UE that needs to connect to the Wi-Fi hotspot device.

In addition, the management application program may also run in a device except the other UE, such as a server. In this case, the device may acquire the two-dimensional barcode from the management application program, and send the two-dimensional barcode to the other UE.

Optionally, as another embodiment, the Wi-Fi authentication information may include at least one of an SSID, an authentication mode, and an authentication password.

In addition, the two-dimensional barcode in this embodiment of the present disclosure may further be replaced by a barcode, a three-dimensional barcode, or other predefined graphics, all of which can be used for encapsulating Wi-Fi authentication information.

Optionally, as another embodiment, the Wi-Fi hotspot device may dynamically update the Wi-Fi authentication information. In this case, in step 310, the Wi-Fi hotspot device may dynamically generate a two-dimensional barcode according to dynamically updated Wi-Fi authentication information.

Furthermore, the Wi-Fi authentication information may change dynamically, and the Wi-Fi hotspot device may dynamically generate a two-dimensional barcode according to changed Wi-Fi authentication information. For example, the authentication password in the Wi-Fi authentication information may be randomly generated, or may change according to a preset rule. In this case, the Wi-Fi hotspot device may update the Wi-Fi authentication information, generate an updated two-dimensional barcode based on the updated authentication information, and may set the updated two-dimensional barcode in the management application program.

As can be seen, the Wi-Fi hotspot device can dynamically generate a two-dimensional barcode according to dynamically updated Wi-Fi authentication information, thereby further improving security of the Wi-Fi network.

Figure 4:
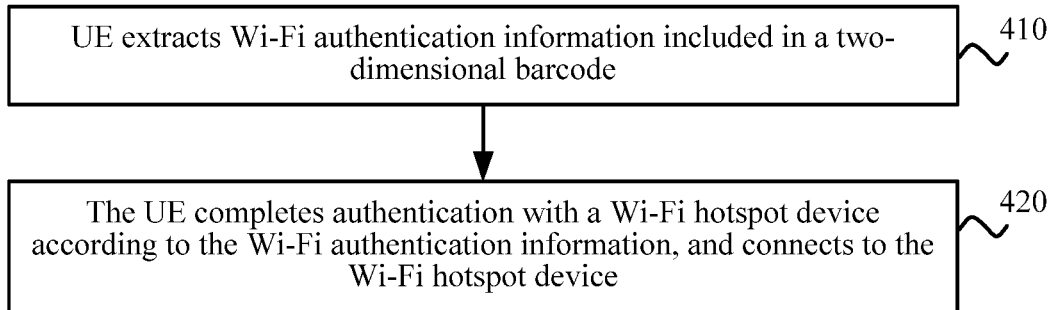
FIG. 4 is a schematic flowchart of a method for connecting to a Wi-Fi hotspot device according to another embodiment of the present disclosure.

FIG. 4 is a schematic flowchart of a method for connecting to a Wi-Fi hotspot device according to another embodiment of the present disclosure. The method in FIG. 4 is executed by the UE, and the method may include the following steps.

Step 410: The UE extracts Wi-Fi authentication information included in a two-dimensional barcode.

Step 420: The UE completes authentication with a Wi-Fi hotspot device according to the Wi-Fi authentication information, and connects to the Wi-Fi hotspot device.

In this embodiment, for specific descriptions of the two-dimensional barcode, reference may be made to the embodiments of FIG. 1 and FIG. 2, which are not described again.

In this embodiment of the present disclosure, Wi-Fi authentication information included in a two-dimensional barcode generated by a Wi-Fi hotspot device is extracted, and the Wi-Fi hotspot device is connected to according to the Wi-Fi authentication information. Therefore, a user does not need to manually input authentication information, thereby improving user experience.

As can be seen, in this embodiment of the present disclosure, the user does not need to input Wi-Fi authentication information into UE, which can reduce operations of the user.

Optionally, as an embodiment, the two-dimensional barcode may be generated by the Wi-Fi hotspot device. Furthermore, the Wi-Fi hotspot device may generate the two-dimensional barcode by itself.

Optionally, as another embodiment, the two-dimensional barcode may be generated by a management device of the Wi-Fi hotspot device.

Furthermore, the two-dimensional barcode may be generated using another device, such as a management device that is particularly used to generate a two-dimensional barcode. The management device may acquire Wi-Fi authentication information from the Wi-Fi hotspot device, and generate a two-dimensional barcode according to the Wi-Fi authentication information.

The management device may send the generated two-dimensional barcode to the Wi-Fi hotspot device, and the Wi-Fi hotspot device presents the two-dimensional barcode on a display screen of the Wi-Fi hotspot device. Alternatively, the Wi-Fi hotspot device sets the two-dimensional barcode in a management application program that corresponds to the Wi-Fi hotspot device.

In addition, the management device may not send the two-dimensional barcode to the Wi-Fi hotspot device, but directly sets the two-dimensional barcode in the management application program that corresponds to the Wi-Fi hotspot device.

Optionally, as another embodiment, the Wi-Fi authentication information may include an SSID, an authentication mode, and an authentication password.

Optionally, as another embodiment, in step 410, the UE may scan a two-dimensional barcode that is presented on the display screen of the Wi-Fi hotspot device, and extract Wi-Fi authentication information included in the two-dimensional barcode.

For a Wi-Fi hotspot device that has a display screen, the Wi-Fi hotspot device may present the two-dimensional barcode on the display screen of the Wi-Fi hotspot device. The UE may scan the presented two-dimensional barcode, for example, the UE may scan the two-dimensional barcode using a corresponding App, and then extract the Wi-Fi authentication information in the two-dimensional barcode.

Optionally, as another embodiment, in step 410, the UE may scan a two-dimensional barcode that is presented on a display screen of another UE, and extract Wi-Fi authentication information included in the two-dimensional barcode, where the two-dimensional barcode is acquired by the other UE from the management application program that corresponds to the Wi-Fi hotspot device.

The two-dimensional barcode may be set in the management application program that corresponds to the Wi-Fi hotspot device. For example, the management application program may be a Web management page that corresponds to the Wi-Fi hotspot device, or may be a third-party App that corresponds to the Wi-Fi hotspot device. The other UE may acquire the two-dimensional barcode from the management application program, and present the two-dimensional barcode on a display screen of the other UE. The foregoing UE that needs to connect to the Wi-Fi hotspot device may scan the two-dimensional barcode presented on the display screen of the other UE, to extract the Wi-Fi authentication information.

In addition, the foregoing UE that needs to connect to the Wi-Fi hotspot device may also acquire the two-dimensional barcode using the third-party App that corresponds to the Wi-Fi hotspot device, scan the two-dimensional barcode, and then extract the Wi-Fi authentication information.

Optionally, as another embodiment, the management application program may run in the other UE. In this case, the other UE can acquire the two-dimensional barcode from the management application program.

Optionally, as another embodiment, before step 420, the UE may present prompt information, where the prompt information is used to instruct to connect to the Wi-Fi hotspot device, and may complete authentication with the Wi-Fi hotspot device according to the Wi-Fi authentication information and based on input corresponding to the prompt information, and connect to the Wi-Fi hotspot device.

For example, the UE may present prompt information that is used to prompt the user to confirm connection to the Wi-Fi hotspot device, for example, may present a "connect" button. The user may perform input according to the prompt information, for example, may click the "connect" button, which indicates that the user confirms connection to the Wi-Fi hotspot device. Then, the UE may connect to the Wi-Fi hotspot device based on the input and according to the extracted Wi-Fi authentication information.

Alternatively, the UE may not present prompt information, but directly connects to the Wi-Fi hotspot device. This can reduce operations of the user, thereby improving user experience.

Optionally, as another embodiment, before step 420, the UE may check whether a Wi-Fi function of the UE is enabled. If the Wi-Fi function is not enabled, the UE may enable the Wi-Fi function.

Furthermore, the UE may check whether the Wi-Fi function of the UE is enabled, and if the Wi-Fi function is not enabled, the UE may automatically enable the function before connecting to the Wi-Fi hotspot device. In an existing process, a user needs to proactively enable a Wi-Fi function of UE, which increases operations. However, in this embodiment, the UE can automatically enable the function before connecting to the Wi-Fi hotspot device, which can reduce operations of the user, thereby improving user experience.

Figure 5:
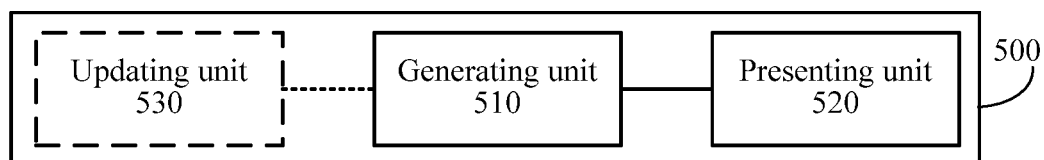
FIG. 5 is a schematic block diagram of a Wi-Fi hotspot device according to an embodiment of the present disclosure.

FIG. 5 is a schematic block diagram of a Wi-Fi hotspot device according to an embodiment of the present disclosure. A product form of the Wi-Fi hotspot device in FIG. 5 may be a wireless router, mobile Wi-Fi, or the like. A Wi-Fi hotspot device 500 includes a generating unit 510 and a presenting unit 520.

The generating unit 510 generates a two-dimensional barcode according to Wi-Fi authentication information, where the two-dimensional barcode includes the Wi-Fi authentication information, and the Wi-Fi authentication information is used for authentication prior to connection to the Wi-Fi hotspot device 500. The presenting unit 520 presents the two-dimensional barcode to UE using a display screen of the Wi-Fi hotspot device.

In this embodiment of the present disclosure, the Wi-Fi hotspot device generates the two-dimensional barcode that includes the Wi-Fi authentication information, and presents the two-dimensional barcode to the UE using the display screen of the Wi-Fi hotspot device such that the UE can connect to the Wi-Fi hotspot device according to the two-dimensional barcode, and a user does not need to memorize or record the Wi-Fi authentication information, thereby improving user experience.

Optionally, as an embodiment, the Wi-Fi authentication information may include at least one of an SSID, an authentication mode, and an authentication password.

Optionally, as another embodiment, the Wi-Fi hotspot device 500 may further include an updating unit 530. The updating unit 530 may dynamically update the Wi-Fi authentication information. The generating unit 510 may dynamically generate a two-dimensional barcode according to dynamically updated Wi-Fi authentication information.

For other functions and operations of the Wi-Fi hotspot device 500, reference may be made to processes involving a Wi-Fi hotspot device in the foregoing method embodiment of FIG. 1, and to avoid repetition, details are not provided again herein.

Figure 6:
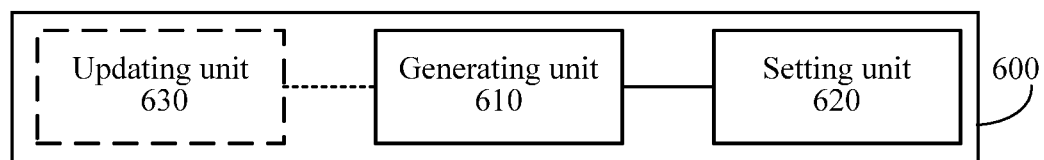
FIG. 6 is a schematic block diagram of a Wi-Fi hotspot device according to another embodiment of the present disclosure.

FIG. 6 is a schematic block diagram of a Wi-Fi hotspot device according to another embodiment of the present disclosure. A product form of the Wi-Fi hotspot device in FIG. 6 may be a wireless router, mobile Wi-Fi, or the like. A Wi-Fi hotspot device 600 includes a generating unit 610 and a setting unit 620.

The generating unit 610 generates a two-dimensional barcode according to Wi-Fi authentication information, where the two-dimensional barcode includes the Wi-Fi authentication information, and the Wi-Fi authentication information is used for authentication prior to connection to the Wi-Fi hotspot device.

The setting unit 620 sets the two-dimensional barcode in a management application program that corresponds to the Wi-Fi hotspot device, where the management application program is used to provide the two-dimensional barcode for another UE, and the other UE is used to present, using a display screen of the other UE, the two-dimensional barcode to UE that needs to connect to the Wi-Fi hotspot device.

In this embodiment of the present disclosure, the Wi-Fi hotspot device generates the two-dimensional barcode that includes the Wi-Fi authentication information, and sets the two-dimensional barcode in the management application program that corresponds to the Wi-Fi hotspot device such that the other UE can acquire the two-dimensional barcode from the management application program and present the two-dimensional barcode to the UE that needs to connect to the Wi-Fi hotspot device such that the UE that needs to connect to the Wi-Fi hotspot device can connect to the Wi-Fi hotspot device according to the two-dimensional barcode, and a user does not need to memorize or record the Wi-Fi authentication information, thereby improving user experience.

Optionally, as an embodiment, the management application program may run in the other UE.

Optionally, as another embodiment, the Wi-Fi hotspot device 600 may further include an updating unit 630.

The updating unit 630 may dynamically update the Wi-Fi authentication information. The generating unit 610 may dynamically generate a two-dimensional barcode according to dynamically updated Wi-Fi authentication information.

Optionally, as another embodiment, the Wi-Fi authentication information may include at least one of an SSID, an authentication mode, and an authentication password.

For other functions and operations of the Wi-Fi hotspot device 600, reference may be made to processes involving a Wi-Fi hotspot device in the foregoing method embodiment of FIG. 3, and to avoid repetition, details are not provided again herein.

Figure 7:
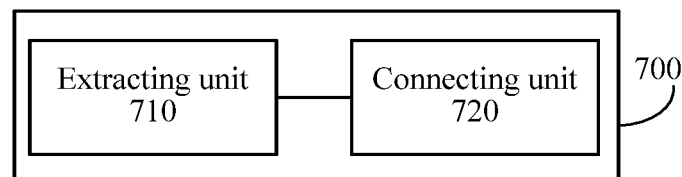
FIG. 7 is a schematic block diagram of UE according to an embodiment of the present disclosure.

FIG. 7 is a schematic block diagram of a UE according to an embodiment of the present disclosure. A product form of UE 700 in FIG. 7 may be a mobile phone or a tablet computer, or may be a smart wearable device such as a smart watch or smart glasses, or the like. The UE 700 includes an extracting unit 710 and a connecting unit 720.

The extracting unit 710 extracts Wi-Fi authentication information included in a two-dimensional barcode. The connecting unit 720 completes authentication with a Wi-Fi hotspot device according to the Wi-Fi authentication information, and connects to the Wi-Fi hotspot device.

In this embodiment of the present disclosure, the Wi-Fi authentication information included in the two-dimensional barcode generated by the Wi-Fi hotspot device is extracted, and the Wi-Fi hotspot device is connected to according to the Wi-Fi authentication information. Therefore, a user does not need to manually input authentication information, thereby improving user experience.

Optionally, as an embodiment, the Wi-Fi authentication information may include at least one of an SSID, an authentication mode, and an authentication password.

Optionally, as another embodiment, the two-dimensional barcode may be generated by the Wi-Fi hotspot device.

Optionally, as another embodiment, the two-dimensional barcode may be generated by a management device that corresponds to the Wi-Fi hotspot device.

Optionally, as another embodiment, the extracting unit 710 may scan a two-dimensional barcode that is presented on a display screen of the Wi-Fi hotspot device, and extract Wi-Fi authentication information included in the two-dimensional barcode.

Optionally, as another embodiment, the extracting unit 710 may scan a two-dimensional barcode that is presented on a display screen of another UE, and extract Wi-Fi authentication information included in the two-dimensional barcode, where the two-dimensional barcode is acquired by the other UE from a management application program that corresponds to the Wi-Fi hotspot device.

Optionally, as another embodiment, the management application program may run in the other UE.

Optionally, as another embodiment, the connecting unit 720 may further check, before connecting to the Wi-Fi hotspot device, whether a Wi-Fi function of the UE 700 is enabled. If the Wi-Fi function is not enabled, the connecting unit 720 may enable the Wi-Fi function.

For other functions and operations of the UE 700, reference may be made to processes involving UE in the foregoing method embodiment of FIG. 4, and to avoid repetition, details are not provided again herein.

Figure 8:
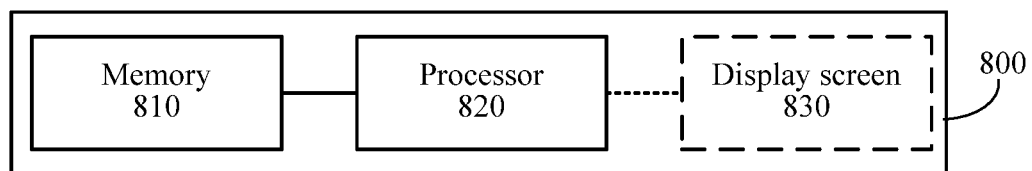
FIG. 8 is a schematic block diagram of a Wi-Fi hotspot device according to another embodiment of the present disclosure.

FIG. 8 is a schematic block diagram of a Wi-Fi hotspot device according to another embodiment of the present disclosure. A product form of a Wi-Fi hotspot device 800 in FIG. 8 may be a wireless router, mobile Wi-Fi, or the like. The Wi-Fi hotspot device 800 includes a memory 810, a processor 820, and a display screen 830.

The memory 810 may include a random access memory (RAM), a flash memory, a read-only memory (ROM), a programmable read-only memory, a non-volatile memory, a register, or the like. The processor 820 may be a central processing unit (CPU).

The memory 810 is configured to store an executable instruction. The processor 820 may execute the executable instruction stored in the memory 810, and is configured to generate a two-dimensional barcode according to Wi-Fi authentication information, where the two-dimensional barcode includes the Wi-Fi authentication information, and the Wi-Fi authentication information is used for authentication prior to connection to the Wi-Fi hotspot device 800, and present the two-dimensional barcode to UE using the display screen 830.

In this embodiment of the present disclosure, the Wi-Fi hotspot device generates the two-dimensional barcode that includes the Wi-Fi authentication information, and presents the two-dimensional barcode to the UE such that the UE can connect to the Wi-Fi hotspot device according to the two-dimensional barcode, and a user does not need to manually input authentication information, thereby improving user experience.

Optionally, as an embodiment, the Wi-Fi authentication information may include at least one of an SSID, an authentication mode, and an authentication password.

Optionally, as another embodiment, the processor 820 may further dynamically update the Wi-Fi authentication information, and dynamically generate a two-dimensional barcode according to dynamically updated Wi-Fi authentication information.

For other functions and operations of the Wi-Fi hotspot device 800, reference may be made to processes involving a Wi-Fi hotspot device in the foregoing method embodiment of FIG. 1, and to avoid repetition, details are not provided again herein.

Figure 9:
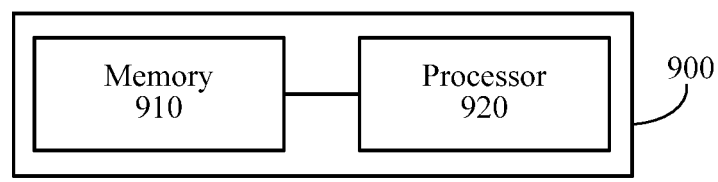
FIG. 9 is a schematic block diagram of a Wi-Fi hotspot device according to another embodiment of the present disclosure.

FIG. 9 is a schematic block diagram of a Wi-Fi hotspot device according to another embodiment of the present disclosure. A product form of a Wi-Fi hotspot device 900 in FIG. 9 may be a wireless router, mobile Wi-Fi, or the like. The Wi-Fi hotspot device 900 includes a memory 910 and a processor 920.

The memory 910 may include a RAM, a flash memory, a ROM, a programmable read-only memory, a non-volatile memory, a register, or the like. The processor 920 may be a CPU.

The memory 910 is configured to store an executable instruction. The processor 920 may execute the executable instruction stored in the memory 910, and is configured to generate a two-dimensional barcode according to Wi-Fi authentication information, where the two-dimensional barcode includes the Wi-Fi authentication information, and the Wi-Fi authentication information is used for authentication prior to connection to the Wi-Fi hotspot device, and set the two-dimensional barcode in a management application program that corresponds to the Wi-Fi hotspot device, where the management application program is used to provide the two-dimensional barcode for another UE, and the other UE is used to present, using a display screen of the other UE, the two-dimensional barcode to UE that needs to connect to the Wi-Fi hotspot device.

In this embodiment of the present disclosure, the Wi-Fi hotspot device generates the two-dimensional barcode that includes the Wi-Fi authentication information, and sets the two-dimensional barcode in the management application program that corresponds to the Wi-Fi hotspot device such that the other UE can acquire the two-dimensional barcode from the management application program and present the two-dimensional barcode to the UE that needs to connect to the Wi-Fi hotspot device such that the UE that needs to connect to the Wi-Fi hotspot device can connect to the Wi-Fi hotspot device according to the two-dimensional barcode, and a user does not need to memorize or record the Wi-Fi authentication information, thereby improving user experience.

Optionally, as an embodiment, the Wi-Fi authentication information may include at least one of an SSID, an authentication mode, and an authentication password.

Optionally, as another embodiment, the processor 920 may further dynamically update the Wi-Fi authentication information, and dynamically generate a two-dimensional barcode according to dynamically updated Wi-Fi authentication information.

Optionally, as another embodiment, the management application program may run in the foregoing another UE.

For other functions and operations of the Wi-Fi hotspot device 900, reference may be made to processes involving a Wi-Fi hotspot device in the foregoing method embodiment of FIG. 3, and to avoid repetition, details are not provided again herein.

Figure 10:
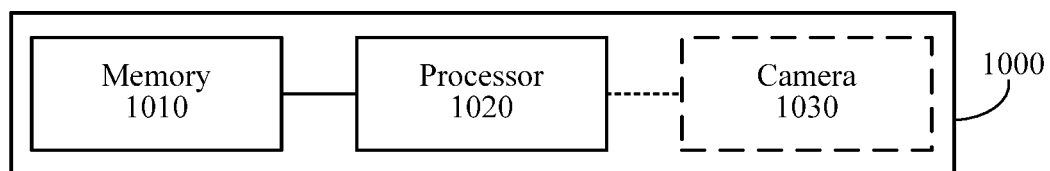
FIG. 10 is a schematic block diagram of UE according to another embodiment of the present disclosure.

FIG. 10 is a schematic block diagram of UE according to another embodiment of the present disclosure. A product form of UE 1000 in FIG. 10 may be a mobile phone or a tablet computer, or may be a smart wearable device such as a smart watch or smart glasses, or the like. The UE 1000 includes a memory 1010 and a processor 1020.

The memory 1010 may include a RAM, a flash memory, a ROM, a programmable read-only memory, a non-volatile memory, a register, or the like. The processor 1020 may be a CPU.

The memory 1010 is configured to store an executable instruction. The processor 1020 may execute the executable instruction stored in the memory 1010, and is configured to extract Wi-Fi authentication information included in a two-dimensional barcode, and complete authentication with a Wi-Fi hotspot device according to the Wi-Fi authentication information, and connect to the Wi-Fi hotspot device.

In this embodiment of the present disclosure, the Wi-Fi authentication information included in the two-dimensional barcode generated by the Wi-Fi hotspot device is extracted, and the Wi-Fi hotspot device is connected to according to the Wi-Fi authentication information. Therefore, a user does not need to manually input authentication information, thereby improving user experience.

Optionally, as an embodiment, the Wi-Fi authentication information may include at least one of an SSID, an authentication mode, and an authentication password.

Optionally, as another embodiment, the two-dimensional barcode may be generated by the Wi-Fi hotspot device.

Optionally, as another embodiment, the two-dimensional barcode may be generated by a management device that corresponds to the Wi-Fi hotspot device.

Optionally, as another embodiment, the UE 1000 may further include a camera 1030. The processor 1020 may control the camera 1030 to scan a two-dimensional barcode that is presented on a display screen of the Wi-Fi hotspot device, and extract Wi-Fi authentication information included in the two-dimensional barcode.

Optionally, as another embodiment, the processor 1020 may control the camera 1030 to scan a two-dimensional barcode that is presented on a display screen of another UE, and extract Wi-Fi authentication information included in the two-dimensional barcode, where the two-dimensional barcode is acquired by the other UE from a management application program that corresponds to the Wi-Fi hotspot device.

Optionally, as another embodiment, the management application program may run in the other UE.

Optionally, as another embodiment, the processor 1020 may further check, before connecting to the Wi-Fi hotspot device, whether a Wi-Fi function of the UE 1000 is enabled. If the Wi-Fi function is not enabled, the processor 1020 enables the Wi-Fi function.

For other functions and operations of the UE 1000, reference may be made to processes involving UE in the foregoing method embodiment of FIG. 4, and to avoid repetition, details are not provided again herein.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method comprising:
   generating, by a first user equipment (UE), a two-dimensional barcode according to a wireless local area network (WLAN) authentication information corresponding to a WLAN hotspot device, wherein the WLAN authentication information is used for authentication to connect with the WLAN hotspot device;
   sending, by the first UE, the two-dimensional barcode to the WLAN hotspot device;
   scanning, by a second UE, the two-dimensional barcode presented on a display screen of the WLAN hotspot device;
   extracting, by the second UE, the WLAN authentication information from the two-dimensional barcode;
   presenting, by the second UE to a user, prompt information that instructs the user to connect to the WLAN hotspot device after the WLAN authentication information is successfully extracted from the two-dimensional barcode, wherein the prompt information comprises a button displayed for connection confirmation;
automatically enabling, by the second UE before connecting to the WLAN hotspot device, a WLAN function of the second UE when the WLAN function of the second UE is not already enabled;
receiving, by the second UE, an input on the button;
in response to the input on the button, completing, by the second UE, authentication with the WLAN hotspot device according to the WLAN authentication information; and
connecting, by the second UE, to the WLAN hotspot device.

2. The method of claim 1, wherein the two-dimensional barcode comprises a quick response (QR) code.

3. The method of claim 1, wherein the WLAN authentication information comprises at least one of: a service set identifier (SSID), an authentication mode, or an authentication password.

4. The method of claim 1, further comprising sending, by the second UE, the two-dimensional barcode to a third UE.

5. The method of claim 4, wherein the WLAN authentication information comprises at least one of: a service set identifier (SSID), an authentication mode, or an authentication password.

6. The method of claim 1, wherein the WLAN authentication information is dynamically changed by the WLAN hotspot device.

7. The method of claim 6, wherein the two-dimensional barcode is dynamically generated according to the dynamically changed WLAN authentication information.

8. The method of claim 1, further comprising receiving, by the first UE, the WLAN authentication information from the WLAN hotspot device.

9. A system comprising:
a first electronic device; and
a second electronic device,
wherein the first electronic device is configured to:
    generate a two-dimensional barcode according to a wireless local area network (WLAN) authentication information corresponding to a WLAN hotspot device, wherein the WLAN authentication information is used for authentication to connect with the WLAN hotspot device; and
    send the two-dimensional barcode to the WLAN hotspot device,
wherein the second electronic device is configured to:
    scan the two-dimensional barcode presented on a display screen of the WLAN hotspot device;
    extract the WLAN authentication information from the two-dimensional barcode, wherein the WLAN authentication information comprises at least one of: a service set identifier (SSID), an authentication mode, or an authentication password;
    present, to a user, prompt information that instructs the user to connect to the WLAN hotspot device after the WLAN authentication information is successfully extracted from the two-dimensional barcode, wherein the prompt information comprises a button displayed for connection confirmation;
    when a WLAN function of the second electronic device is not already enabled, automatically enable the WLAN function of the second electronic device before connecting to the WLAN hotspot device;
    receive an input on the button;
    in response to the input on the button, complete authentication with the WLAN hotspot device according to the WLAN authentication information; and
    connect to the WLAN hotspot device.

10. The system of claim 9, wherein the two-dimensional barcode comprises a quick response (QR) code.

11. The system of claim 9, wherein the second electronic device is further configured to send the two-dimensional barcode to a third UE.

12. The system of claim 9, wherein the WLAN authentication information is dynamically changed by the WLAN hotspot device.

13. The system of claim 12, wherein the two-dimensional barcode is dynamically generated according to the dynamically changed WLAN authentication information.

14. The system of claim 9, wherein the first electronic device is further configured to receive the WLAN authentication information from the WLAN hotspot device.

15. A system, comprising:
a first electronic device;
a second electronic device; and
a wireless local area network (WLAN) hotspot device in communication with the first electronic device and the second electronic device,
wherein the first electronic device is configured to:
    generate a two-dimensional barcode according to a WLAN authentication information corresponding to the WLAN hotspot device, wherein the WLAN authentication information is used for authentication to connect with the WLAN hotspot device; and
    send the two-dimensional barcode to the WLAN hotspot device,
wherein the second electronic device is configured to:
    scan the two-dimensional barcode presented on a display screen of the WLAN hotspot device;
    extract the WLAN authentication information from the two-dimensional barcode, wherein the WLAN authentication information comprises at least one of: a service set identifier (SSID), an authentication mode, or an authentication password;
    present, to a user, prompt information that instructs the user to connect to the WLAN hotspot device after the WLAN authentication information is successfully extracted from the two-dimensional barcode, wherein the prompt information comprises a button displayed for connection confirmation;
    receive an input on the button;
    in response to the input on the button, complete authentication with the WLAN hotspot device according to the WLAN authentication information; and
    connect to the WLAN hotspot device.

16. The first UE system of claim 15, wherein the two-dimensional barcode comprises a quick response (QR) code.

17. The system of claim 15, wherein the second electronic device is further configured to send the two-dimensional barcode to a third UE.

18. The system of claim 15, wherein the WLAN authentication information is dynamically changed by the WLAN hotspot device.

19. The system of claim 18, wherein the two-dimensional barcode is dynamically generated according to the dynamically changed WLAN authentication information.

20. The system of claim 15, wherein the first electronic device is further configured to receive the WLAN authentication information from the WLAN hotspot device.

* * * * *

UNITED STATES PATENT AND TRADEMARK OFFICE
CERTIFICATE OF CORRECTION

PATENT NO. : 10,601,811 B2  
APPLICATION NO. : 15/159101  
DATED : March 24, 2020  
INVENTOR(S) : Zhen Zhong Page 1 of 1

It is certified that error appears in the above-identified patent and that said Letters Patent is hereby corrected as shown below:

In the Claims

Claim 16, Column 20, Line 52: "The first UE system" should read "The system"

Signed and Sealed this  
Twelfth Day of May, 2020

Andrei Iancu  
*Director of the United States Patent and Trademark Office*